(12) United States Patent
Seery

(10) Patent No.: US 10,340,836 B2
(45) Date of Patent: Jul. 2, 2019

(54) INTERLOCK SYSTEM FOR MOUNTING AND JOINING PHOTOVOLTAIC MODULES

(71) Applicant: SolarCity Corporation, San Mateo, CA (US)

(72) Inventor: Martin Seery, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 14/954,807

(22) Filed: Nov. 30, 2015

(65) Prior Publication Data

US 2017/0155355 A1    Jun. 1, 2017

(51) Int. Cl.
| | |
|---|---|
| *E04D 13/18* | (2018.01) |
| *H01L 31/048* | (2014.01) |
| *H02S 20/23* | (2014.01) |
| *H02S 30/10* | (2014.01) |
| *H02S 20/24* | (2014.01) |
| *F24S 25/632* | (2018.01) |

(52) U.S. Cl.
CPC .......... *H02S 20/23* (2014.12); *F24S 25/632* (2018.05); *H02S 20/24* (2014.12); *H02S 30/10* (2014.12); *Y02B 10/12* (2013.01); *Y02E 10/47* (2013.01)

(58) Field of Classification Search
CPC ................................ H02S 20/10; H02S 20/23
USPC ....................................................... 52/173.3
See application file for complete search history.

(56) References Cited

U.S. PATENT DOCUMENTS

| | | | | |
|---|---|---|---|---|
| 7,797,889 | B2 * | 9/2010 | McClintock | F24J 2/5211 52/173.3 |
| 8,375,654 | B1 * | 2/2013 | West | F24J 2/5211 52/173.3 |
| 8,511,009 | B2 * | 8/2013 | Kobayashi | E04D 1/30 52/173.3 |
| 8,857,113 | B2 * | 10/2014 | Zhang | H01L 31/048 52/167.5 |
| 8,894,424 | B2 * | 11/2014 | DuPont | F24J 2/4607 439/95 |
| 8,919,052 | B2 * | 12/2014 | West | F24J 2/5211 52/173.3 |
| 8,919,053 | B2 * | 12/2014 | West | F24J 2/5211 52/173.3 |
| 8,938,932 | B1 * | 1/2015 | Wentworth | H02S 20/23 52/173.3 |
| 9,080,792 | B2 * | 7/2015 | Patton | F24J 2/5245 |
| 9,431,953 | B2 * | 8/2016 | Stearns | H02S 20/23 |
| 9,518,596 | B2 * | 12/2016 | West | F24J 2/5247 |
| 9,845,972 | B2 * | 12/2017 | West | F24S 25/61 |
| 2003/0070368 | A1 * | 4/2003 | Shingleton | F24J 2/5205 52/173.3 |

(Continued)

*Primary Examiner* — Joshua J Michener
*Assistant Examiner* — James Buckle, Jr.
(74) *Attorney, Agent, or Firm* — Kilpatrick Townsend & Stockton LLP

(57) ABSTRACT

Assemblies and couplings for mounting PV modules are provided. An assembly is provided to avoid conflicts between linkages used to adjoin adjacent PV modules and leveling feet used to mount the PV modules to supporting structure. Specifically, an interlock support coupling is provided that may include a shaft with a locking portion disposed at the end that interfaces with an interlock bracket used to couple adjacent PV modules and a housing with an opening for receiving a connection with a supporting foot. An interlock bracket may be provided with a slot for receiving an interlock support coupling.

12 Claims, 12 Drawing Sheets

(56) References Cited

U.S. PATENT DOCUMENTS

| | | | |
|---|---|---|---|
| 2008/0000173 A1* | 1/2008 | Lenox | F24J 2/5245 52/173.1 |
| 2009/0025314 A1* | 1/2009 | Komamine | F24J 2/5207 52/173.3 |
| 2010/0243023 A1* | 9/2010 | Patton | F24J 2/4607 136/244 |
| 2012/0152326 A1* | 6/2012 | West | F24J 2/5205 136/251 |
| 2012/0234378 A1* | 9/2012 | West | F24J 2/5211 136/251 |
| 2012/0298188 A1* | 11/2012 | West | F24J 2/5211 136/251 |
| 2012/0298817 A1* | 11/2012 | West | F24J 2/5211 248/220.22 |
| 2014/0053891 A1* | 2/2014 | West | F24J 2/5211 136/251 |
| 2014/0130847 A1* | 5/2014 | West | F24J 2/5211 136/251 |
| 2017/0063007 A1* | 3/2017 | Hudson | H01R 4/64 |

* cited by examiner

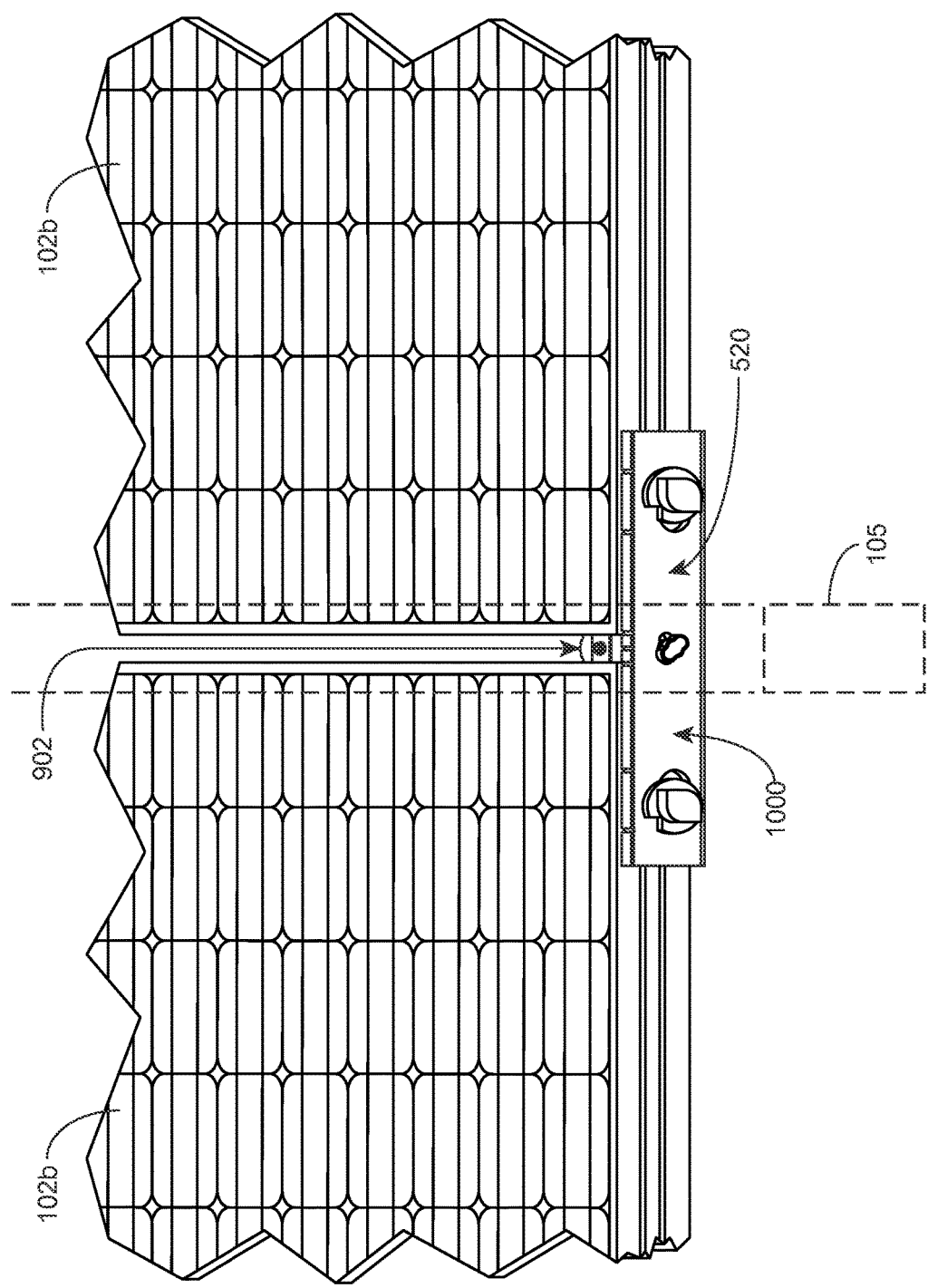

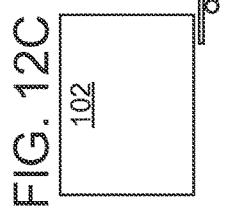
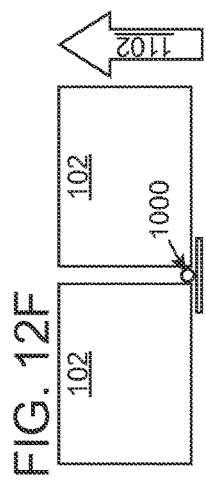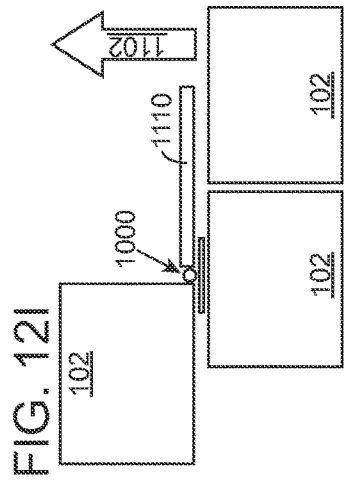
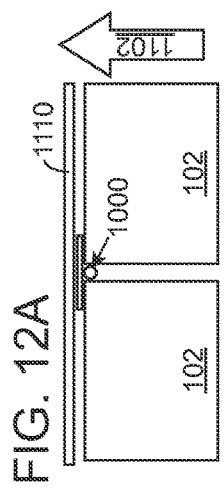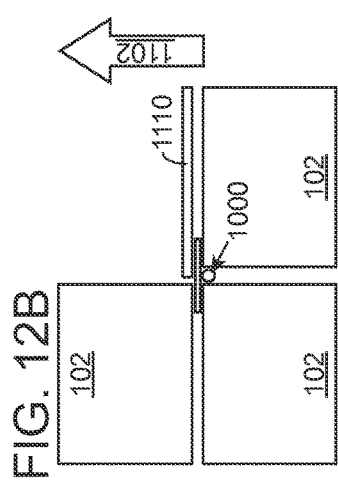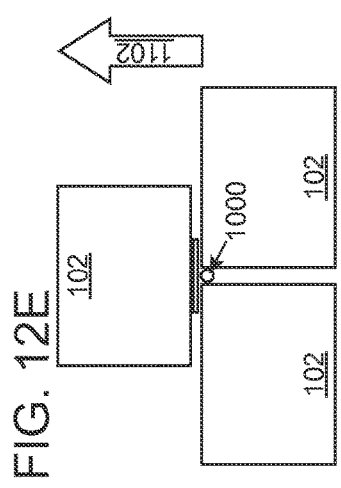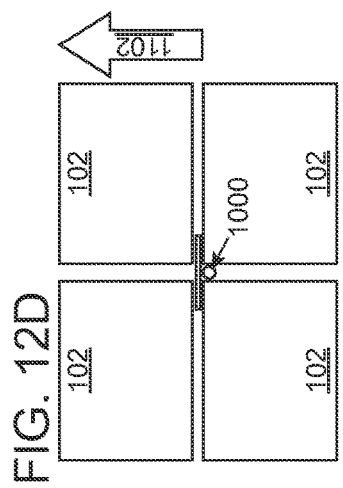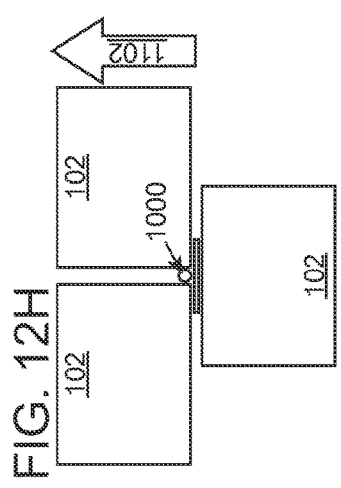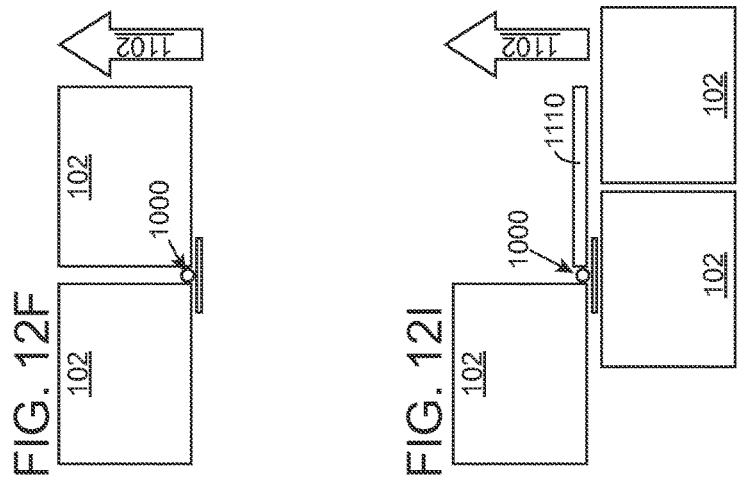

INTERLOCK SYSTEM FOR MOUNTING AND JOINING PHOTOVOLTAIC MODULES

FIELD OF THE INVENTION

This relates in general to photovoltaic (PV) mounting systems, and in particular to systems for joining and mounting PV modules in PV arrays.

BACKGROUND OF THE INVENTION

There are many systems available for mounting PV modules to building structures, such as a roof. These systems serve as a rigid interconnection element between a roof and a PV module to hold the modules in place and resist the forces of gravity and wind.

Some traditional mounting systems consist of rows of rail structures attached to the roof in columns or rows, with module clamps used to attach the PV modules to these rail structures. More recently, San Rafael-based Zep Solar pioneered the use of "rail-free" systems, where the module frames themselves are sufficiently rigid to function as the rails of a PV mounting system. By utilizing the inherent rigidity of module frames as part of the PV mounting system, system part counts and costs of PV mounting systems were significantly reduced while installation time and overall aesthetics were improved. Most rail-free systems, rely on PV module supports which connect to each module frame at various points around the array—typically at least four points on each module. These supports are in turn attached to the roof (via a flashing), most typically into a roof rafter, although they can also be attached to the roof deck.

Both traditional rail mounting systems and rail-free systems typically use mechanical links to link together PV modules in north-south and east-west connections. Due to the variable nature of the PV module arrays, rail structures and/or roof rafters, the desired or required location of mechanical links sometimes conflicts with the desired or required location of the clamps used to attach the PV modules to rail structures or supports used to connect the module frame to the roof and/or roof rafters (in the case of rail-free systems).

One current solution to these conflicts is a specially-designed supporting foot that interfaces between the PV module and the rail or roof rafters, where the base of the foot is designed with sufficient length so as to allow the supporting foot to attach to the desired location (e.g., the predefined location of rail structures or roof rafters) and couple with the PV modules outside of the desired location of the mechanical links adjoining the PV modules. While this allows the mechanical links and the supports to be connected at desired locations, it has a number of limitations. First, the additional length between the connection point to the rail strucures or the roof rafters and the PV modules increases the magnitude of the torque applied to the components, making them more susceptible to failure. Second, the necessary additional length of the supporting foot requires additional material and increases the cost per part.

Another current solution to the conflicts is a specially-designed assembly that both links PV modules in the north-south and east-west directions and couples the modules to the underlying rail structures or roof rafters. For example, so-called "hybrid interlocks" that provide a way to resolve conflicts that may occur between "interlocks" that link PV modules and "leveling feet" that couple the PV modules to roof rafters are described in U.S. Patent Application Publication No. 2012/0234378, filed Dec. 9, 2011 and entitled "Pivot-Fit Connection Apparatus and System for Photovoltaic Arrays." While these "hybrid interlocks" can resolve the conflicts, they too have limitations. First, the parts of such assemblies are complex, and require additional material, greatly increasing the cost per part. Second, such assemblies are typically only applicable to situations where the conflicts occur, introducing complexities in the installation of PV arrays that result in increased time and cost for installation. Furthermore, such assemblies also require installers to bring more parts and associated tools to installation sites in case such an assembly is needed.

Accordingly, there is a need for a more cost-effective solution for resolving conflicts between the mechanical linkages joining PV modules and the supporting members mounting the PV modules to the roof

BRIEF SUMMARY OF THE INVENTION

Some embodiments of the invention are related to an assembly for mounting photovoltaic (PV) modules having a bracket for affixing adjacent PV modules together and a support coupling member that affixes the assembly and the adjacent PV modules to a supporting foot. The bracket can include a slot for receiving the support coupling member. The support coupling member can be configured to be inserted into the bracket through the slot at a first angle, and locked relative to the bracket when rotated to a second angle.

In some embodiments, the slot includes a feature that aids in centering the support coupling member within the slot.

In some embodiments, a difference between the first angle and the second angle is approximately 45 degrees.

In some embodiments, the bracket can include a first surface, and a second surface opposite the first surface, wherein the slot extends from the first surface to the second surface. The support coupling member may be configured to be inserted into the slot from either the first surface or the second surface.

In some embodiments, the support coupling member can include a shaft configured to extend through the slot, wherein the shaft includes a protrusion that penetrates into a surface of the bracket when the support coupling member is rotated into a locked position so as to provide an electrically grounded connection.

In some embodiments, the bracket affixes at least three PV modules together.

In some embodiments, the bracket affixes two adjacent PV modules to at least one array skirt.

In some embodiments, the slot is punched into the bracket.

In some embodiments, the bracket can include a set of openings for receiving coupling members configured to couple the bracket to two adjacent PV modules.

In some embodiments, the support coupling member includes a female threaded opening configured to receive a male threaded screw coupled to the supporting foot. In some embodiments, rotation of the screw adjusts a height at which the assembly and PV modules sit.

In some embodiments, the support coupling member is configured to be upright when rotated to the second angle.

Some embodiments are related to a coupling for interfacing a bracket adjoining at least two photovoltaic modules with an adjustable supporting foot including a housing, a shaft, and a locking portion. The housing may include an opening for receiving a connection with the supporting foot. The shaft may extend from one face of the housing, and may be configured to extend through an opening in the bracket.

The locking portion may be disposed at one end of the shaft, wherein the locking portion is configured to be inserted into the opening of the bracket at a first angle, and locked relative to the bracket when the shaft is rotated to a second angle.

In some embodiments, the locking portion comprises a feature that centers the coupling within the opening in the bracket.

In some embodiments, a difference between the first angle and the second angle is approximately 45 degrees.

In some embodiments, the opening extends from a first surface to a second surface and the coupling may be configured to be inserted into either the first surface or the second surface of the bracket.

In some embodiments, the shaft includes a protrusion that penetrates into a surface of the bracket when the shaft is rotated into the second angle so as to provide an electrically grounded connection.

In some embodiments, the opening in the housing is a female threaded opening configured to receive a male threaded screw coupled to the supporting foot. In some embodiments, rotation of the screw adjusts a height at which the assembly and PV modules sit.

Some embodiments are related to a photovoltaic module mounting system, having a bracket for affixing PV modules together, a leveling foot configured to affix the system to a support structure, and a support coupling member for coupling the bracket and the PV modules to the leveling foot. The bracket may include openings for receiving coupling members used to affix the PV modules to the bracket, and a slot. The support coupling member may be configured to be inserted into the slot of the bracket at a first angle, and locked relative to the bracket when the support coupling member is rotated to a second angle.

In some embodiments, the support coupling member includes a threaded opening, and the support coupling member is coupled to the leveling foot with a screw inserted into the threaded opening.

In some embodiments, the support coupling member is configured to be upright when rotated to the second angle.

In some embodiments, the support coupling member includes at least one protrusion configured to penetrate into a surface of the bracket when the support coupling member is rotated to the second angle so as to provide an electrically grounded connection.

BRIEF DESCRIPTION OF THE DRAWINGS

FIG. 11 shows a perspective view of PV modules coupled with an interlock assembly and mounted on a roof, according to some embodiments of the invention.

FIGS. 12A-12I show exemplary patterns of PV modules coupled with interlock assemblies, according to some embodiments of the invention.

DETAILED DESCRIPTION OF THE INVENTION

Embodiments of the invention are generally related to assemblies, couplings, and systems for mounting PV modules. Generally, PV arrays include a number of mechanical linkages used to adjoin two or more adjacent PV modules and separate PV module supports, such as leveling feet, brackets, or clamps, are used to couple the PV modules to the underlying support structures such as roof rafters or rail systems. When conflicts between the locations of these module supports and mechanical linkages occur, complex and costly parts are required to avoid the conflicting parts. An assembly is provided that allows for less complexity, lower cost parts, and wider applicability than current solutions. Specifically, an interlock support coupling is provided that is compatible with limited modification with both the interlocking mechanical linkages used to adjoin adjacent PV modules, and the base portion of leveling feet used to couple the PV modules to supporting structure. The interlock support coupling includes a shaft with a locking portion disposed at the end that interfaces with an interlock bracket used to couple adjacent PV modules and a housing with an opening for receiving a connection with a supporting foot.

Figure 1:
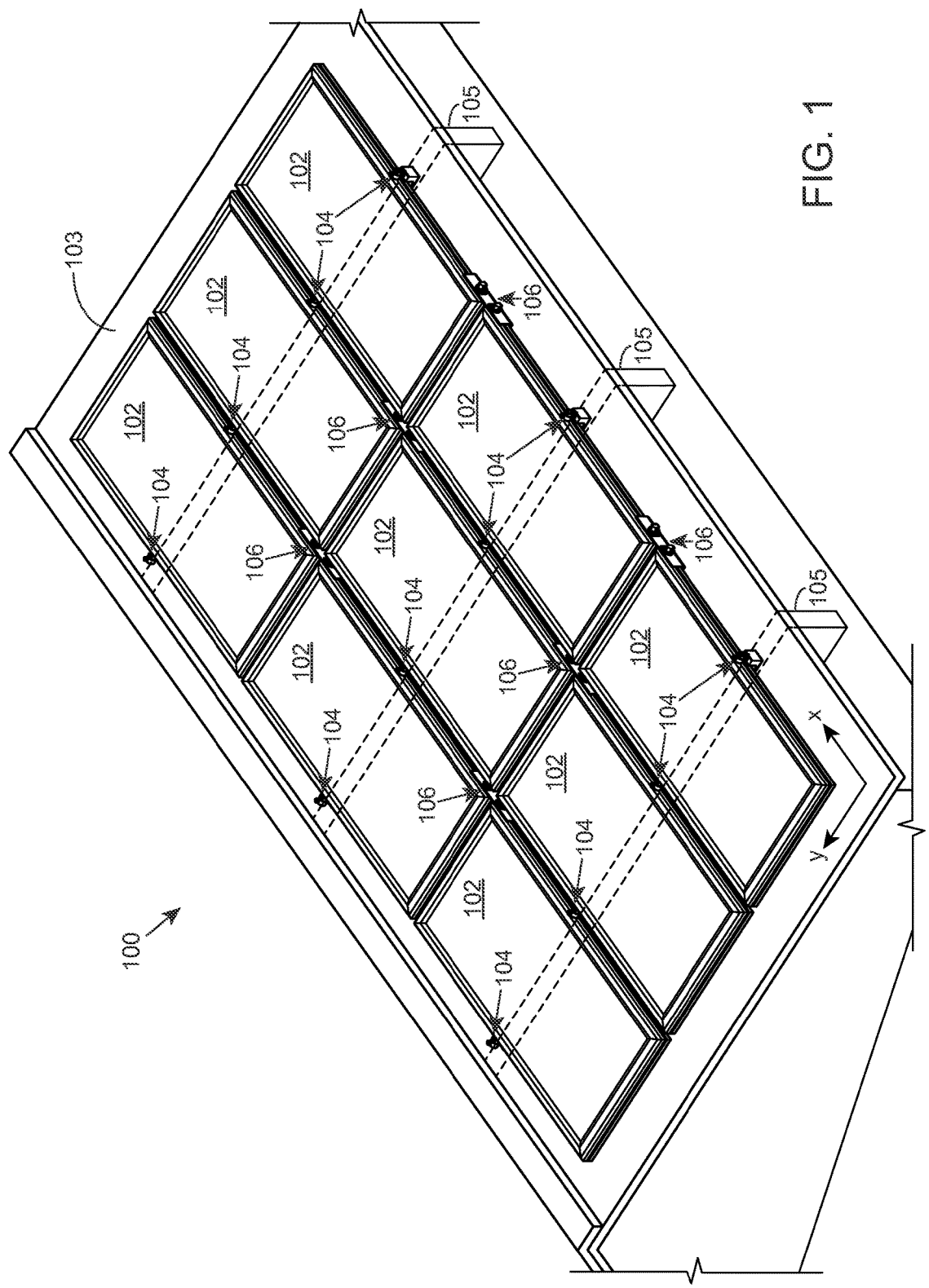
FIG. 1 shows a perspective view of a PV array mounted on a roof, according to some embodiments of the invention.

FIG. 1 shows a perspective view of PV array 100, including a plurality of PV modules 102 laid out in an x-y reference plane on support structure 103. Support structure 103 is herein shown as including a planar surface, however it may be a structure with thickness, width, depth, and other dimension(s); in reference to any mounting structure, such as mounting structure 103, the height adjustment of a coupling described hereinafter is considered relative to any essential surface or essential plane, such as a top surface. The y-direction corresponds to the north-south dimension of the array, and the x-direction corresponds to the east-west direction.

In the embodiment of FIG. 1, the reference plane is defined as being coextensive with a surface of the PV modules, when the PV modules are positioned in their final installed positions. However, in further embodiments, the reference plane may be above an upper surface of PV modules 102, or below the lower surfaces of PV modules 102. PV array 100 may be assembled together and attached to support structure 103 by means of leveling feet, wrap-around leveling feet, double-tongue feet, key coupling feet, brackets, feet, tilt feet, or T-feet, such as leveling feet 104, and interlocks, wrap-around interlocks, series coupling rails, series/parallel couplings, male coupling members, splices, parallel couplings, double-key couplings, or key couplings, such as interlocks 106.

Examples of both leveling feet 104 and interlocks 106 are described in commonly assigned U.S. patent application Ser.

No. 13/402,846, Publication No. 2012/0298817-A1, the disclosure of which is herein incorporated by reference in its entirety. Other components may be coupled to array 100, such as for example a grounding coupling and accessory coupling, but are not shown herein. PV array 100 of FIG. 1 is shown by way of example only. It is understood that array 100 may have more or less modules 102 in the x and/or y direction. In the embodiment shown, support structure 103 may be a roof, such as a slanted roof of a residential dwelling or the like. However, it is understood that PV array 100 may be supported on a wide variety of other support surfaces, such as for example a flat roof, a ground-mounted structure or, in some embodiments, a vertical support structure. The defined x-y reference plane of PV array is substantially parallel to support structure 103, and may be oriented in any of a wide variety of angles from horizontal to vertical.

Where array 100 is provided on a roof (e.g., of a residential dwelling), the position of leveling feet 104 along the x-dimension of modules 102 may be determined by the location of support structures such as rafters 105 as shown in FIG. 1. Although shown for illustrative purposes as rafters 105, it will be understood that the position of leveling feet 104 along the x-dimension of modules 102 may be determined by the location of other supporting structures, including, for example, rail structures attached to the roof in columns or rows.

As illustrated in FIG. 1, the particular layout of array 100 and rafters 105 may avoid conflicts between the installation of leveling feet 104 and interlocks 106. However, many layouts may cause conflicts to occur due to non-uniform rows, obstructions on the roof, and differences between the distance between rafters and the width of PV modules. An example of a layout with such conflicts is shown in FIG. 2.

Figure 2:
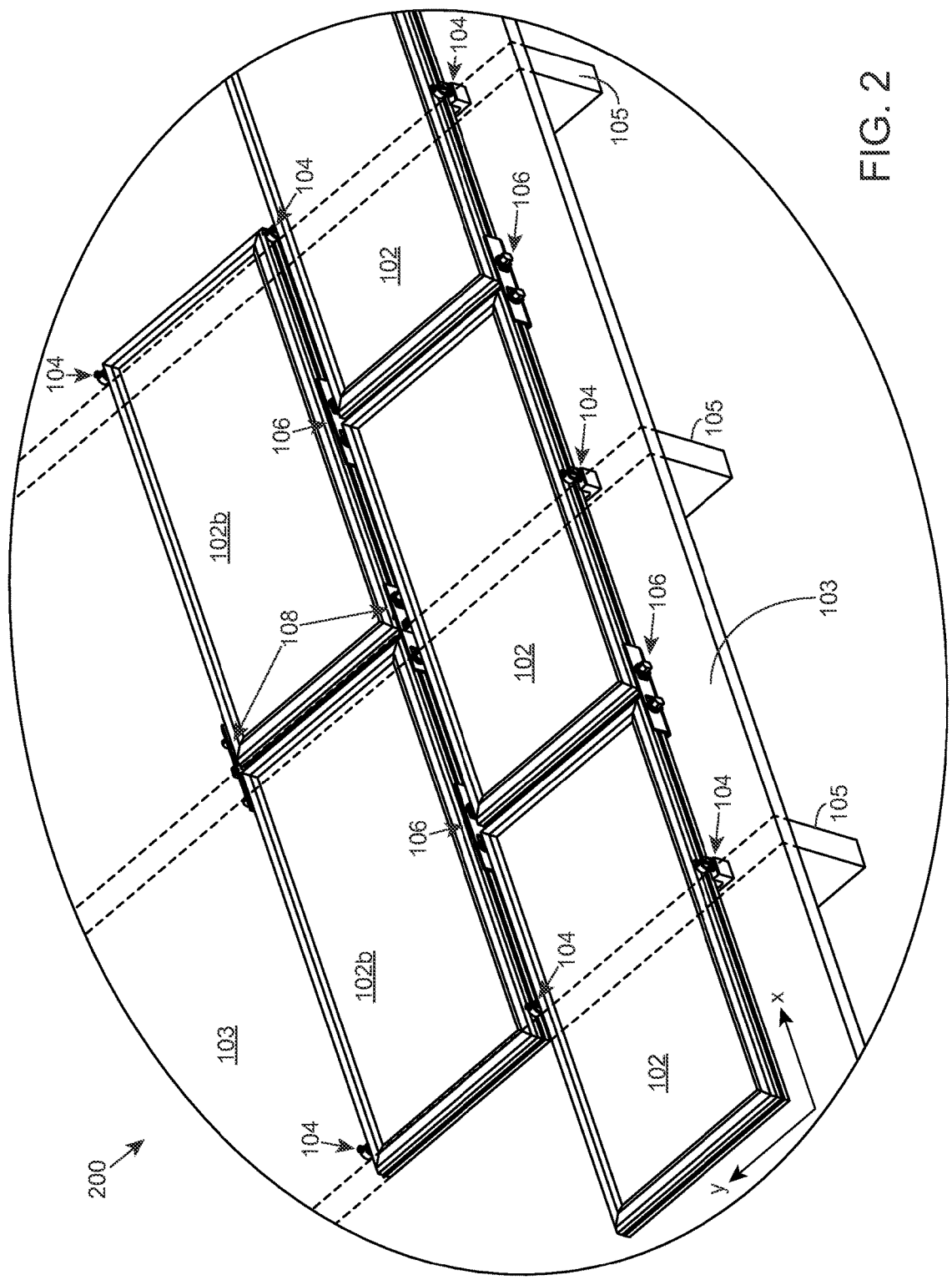
FIG. 2 shows a perspective view of a PV array mounted on a roof, according to some embodiments of the invention.

FIG. 2 shows a portion of a perspective view of PV array 200. As with FIG. 1, PV array 200, includes a plurality of PV modules 102 laid out in an x-y reference plane on support structure 103, which is shown herein illustratively as including a planar surface. As with FIG. 1, PV array 200 of FIG. 2 is shown by way of example only, and it is understood that array 200 may have more or less modules 102 and/or 102a in the x and/or y direction. As can be seen in FIG. 2, while there are no conflicts between leveling feet 104 and interlocks 106 situated in front (i.e., the direction down the roof) of the first row of PV modules 102, the intersection of PV modules 102b coincides with the location of rafter 105. Because both interlocks 106 and leveling feet 104 may be required to interface with portions of PV modules 102 (e.g., features such as grooves within the frames of PV modules 102), they may not be located in the same region due to these conflicts. Accordingly, modified interlock assemblies 108, the operation of which will be described below, may be used to join PV modules 102b in order to avoid such conflict but maintain adequate support and stability of PV array 200.

Figure 3A:
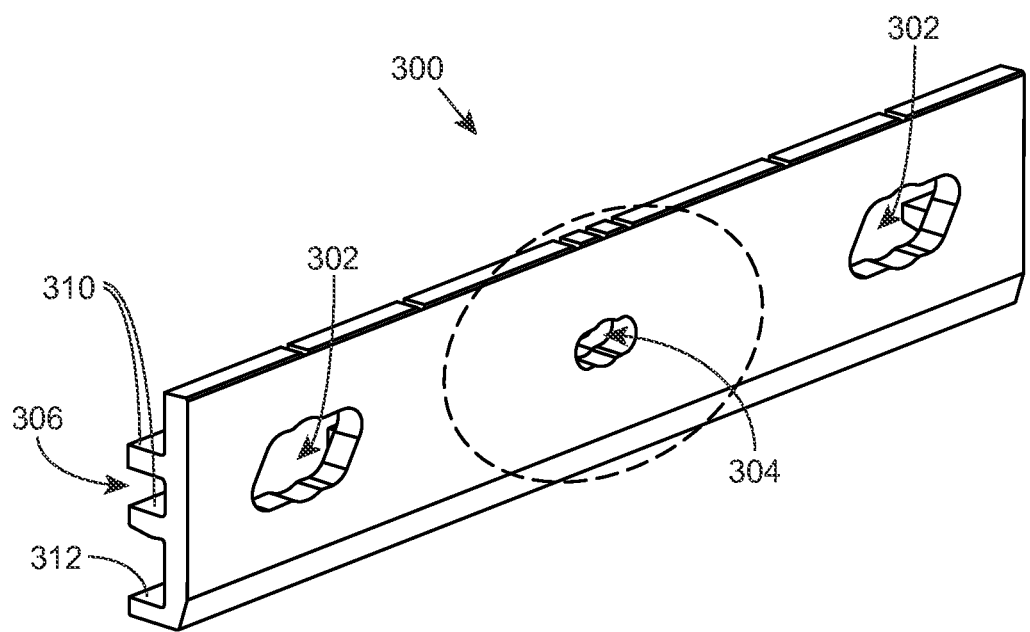
FIG. 3A shows a perspective view of an interlock bracket, according to some embodiments of the invention.

As described above with respect to FIGS. 1 and 2, interlocks 106 may be employed to affix adjacent PV modules together along the x-axis. In the case of conflicts between interlocks 106 and leveling feet 104, a modified assembly may be employed with an interlock bracket for affixing adjacent PV modules together and an interlock support coupling that interfaces the interlock bracket with leveling feet. FIG. 3A shows a perspective view of an interlock bracket according to some embodiments of the invention.

As can be seen in FIG. 3A, interlock bracket 300 includes two openings 302 disposed at opposite ends, and slot 304 disposed at the center of interlock bracket 300. Openings 302 may receive a pair of interlock couplings (not shown in FIG. 3A) which may be held in openings 302 via an interference fit. It will be understood that couplings held in openings 302 may be configured to couple a number of adjacent PV modules. Couplings held in openings 302 may include keys that rotate between a horizontal position to allow insertion into grooves of PV module frames and a vertical position to lock the keys within grooves of PV module frames.

Couplings held in openings 302 may have tongues on opposite sides of the keys that allow for four adjacent PV modules to be coupled using a single interlock with two couplings. For example, the couplings may have keys locking two PV modules on one side of interlock bracket 300 as described above, and tongues on which two PV modules on the other side of interlock bracket 300 may rest. Although described herein in terms of couplings with keys and tongues interfacing with grooves of PV module frames, it will be understood by those skilled in the art that any suitable couplings for affixing adjacent PV modules may be used in conjunction with openings 302, and reference to particular types of couplings are not meant to be limiting.

Figure 3B:
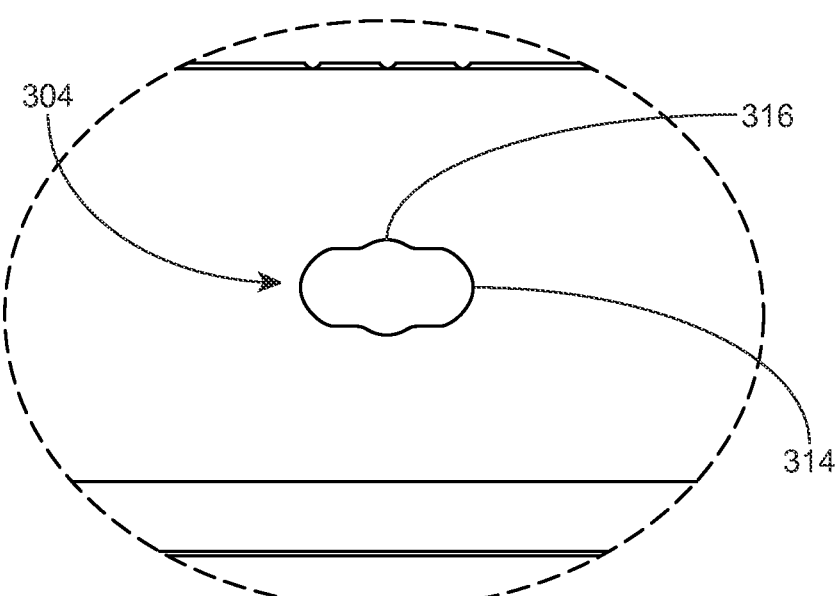
FIG. 3B shows an enlarged front view of a portion of the interlock bracket of FIG. 3A, according to some embodiments of the invention.

Interlock bracket 300 includes slot 304 in addition to openings 302. Slot 304 of interlock bracket 300 may receive an interlock support coupling that interfaces the interlock bracket with leveling feet. As shown in FIG. 3B, which shows an enlarged front view of a portion of interlock bracket 300, slot 304 may be made up of rounded slot 314 and centering feature 316. Centering feature 316 may correspond with a feature on interlock support coupling (to be described below) to allow for easily centering interlock support coupling in slot 304.

It will be understood by those skilled in the art that providing centering feature 316 improves installation and avoids the need for tight tolerances between interlock support coupling and slot 304 that might otherwise be required to avoid excessive sliding of interlock support coupling within slot 304. Although centering feature 316 is shown for illustrative purposes as a circular feature, it will be understood by those skilled in the art that any feature that keeps interlock support coupling from sliding within slot 304 so as to go off center. It will be understood that slot 304 may be generated in interlock bracket 300 by use of a suitable punching or machining tool depending on the material and thickness of interlock bracket 300, such that the cost of generating this modified interlock bracket is not substantially different from interlock brackets previously described.

With further reference to FIG. 3A, interlock bracket 300 may include first surface 306 having a pair of ribs 310 spanning a substantial portion of the length of interlock bracket 300. An upper surface of top rib 310 and a lower surface of bottom rib 310 may be spaced from each other so that ribs fit properly within grooves of PV module frames. In some embodiments, instead of multiple separate ribs, element 310 may instead include a single rib, or lug, having a top surface matching top surface of top rib 310 and a bottom surface matching bottom surface of lower rib 310. First surface 306 may include lip 312 which may be positioned beneath a lower surface of frames of adjacent PV modules once interlock bracket 300 is affixed to adjacent PV modules. Lip 312 may enhance the structural performance of interlock bracket 300 and may be omitted in some embodiments.

Interlock support coupling 400, which may interface with interlock bracket 300, will now be described with reference to FIG. 4. Interlock support coupling 400 includes housing 402, which is depicted as substantially rectangular, but may have any other suitable geometry. Housing 402 may have an opening 404 for receiving couplings to leveling feet used to mount PV modules. Opening 404 may extend all the way through to the opposite surface of housing 402 indicated at 406.

Figure 4:
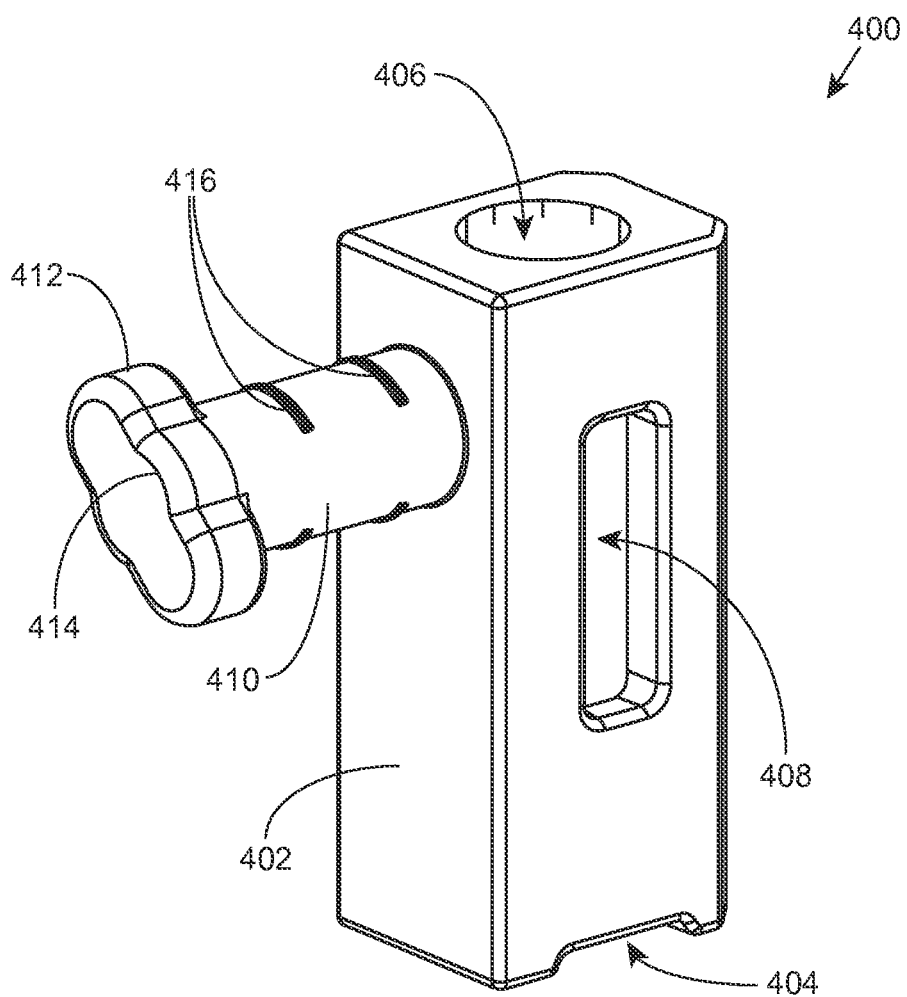
FIG. 4 shows a perspective view of an interlock support coupling, according to some embodiments of the invention.

Although not visible in FIG. 4, the interior surface of opening 404 may be a standard female threaded surface configured to receive a standard male screw used to couple interlock support coupling 400 to leveling feet. For example, the opening may have an M10 left hand thread. Housing 402 may also include window opening 408 that allows an installer to visually inspect any coupling entering through opening 404. The dimensions of housing 402 may be set based at least in part on the desired coupling for leveling feet and an allowable gap between adjacent PV modules in a PV array. For example, the width of housing 402 may be selected to be greater than a minimum required for a given coupling diameter and less than the maximum allowable column gap between adjacent PV modules. In some embodiments, the column gap between adjacent PV modules may be ½ inch, and the width of housing 402 may be less than or equal to that gap so as to fit in between adjacent modules.

Interlock support coupling 400 may include interlock support coupling shaft 410 that extends from one surface of housing 402 and is configured to extend through slot 304 of interlock bracket 300. Locking portion 412 may be disposed at an end of interlock support coupling shaft 410, and may include feature 414 that corresponds to centering feature 316 of slot 304 as described above. Interlock support coupling shaft 410 may be dimensioned such that when installed into slot 304, distance between interlock bracket 300 and housing 402 is minimized. It will be understood that the minimized distance minimizes the moment resulting from forces acting on components coupled to interlock support coupling 400 and/or interlock bracket 300.

In order to allow interlock support coupling 400 to be inserted into interlock bracket 300 from either of first surface 306 or second surface 308 (as will be described below), the dimensions of interlock support coupling shaft 410 and locking portion 412 may be selected so that when interlock support coupling 400 is inserted into second surface 308, housing 402 interfaces with second surface 308 and locking portion 412 interfaces with ribs 310, and when interlock support coupling 400 is inserted into first surface 306, housing 402 interfaces with ribs 310 and locking portion 412 interfaces with second surface 308. It will be understood that in order to allow interlock support coupling 400 to be inserted into interlock bracket 300 from either of first surface 306 or second surface 308, the surface of locking portion 412 that faces housing 402 of interlock support coupling 400 may be configured to either interface with second surface 308 or surfaces of ribs 310. In some embodiments, the surface of locking portion 412 that faces housing 402 may be flat to allow it to smoothly interface with either of second surface 308 or ribs 310.

Interlock support coupling shaft 410 may also include protrusions 416 which serve to penetrate into surfaces of slot 304 of interlock bracket 300 upon rotation of interlock support coupling shaft 410 in order to provide a more stable connection between interlock support coupling 400 and interlock bracket 300. It will be understood that such penetration may also provide for improved electrical grounding between the components, and thus between adjacent PV modules coupled thereto.

Figure 5A:
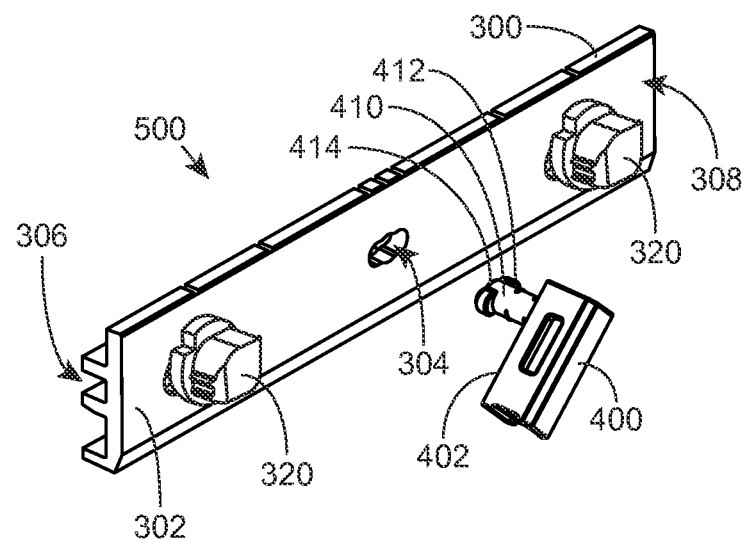
FIGS. 5A-5C show perspective views of steps for assembling an interlock assembly, according to some embodiments of the invention.

Assembly of interlock bracket 300 and interlock support coupling 400 will now be described with reference to FIGS. 5A-5C. FIG. 5A shows assembly 500 which includes interlock bracket 300 with couplings 320 inserted into openings 302. Although not shown in FIG. 5A, it will be understood that assembly 500 may reflect the assembly after couplings 320 have been turned to lock into frames of adjacent PV modules thereby affixing the adjacent PV modules. As shown in FIG. 5A, prior to insertion of interlock support coupling 400 into slot 304, interlock support coupling 400 may be rotated such that locking portion 412 and feature 414 match up with slot 304.

Figure 5B:
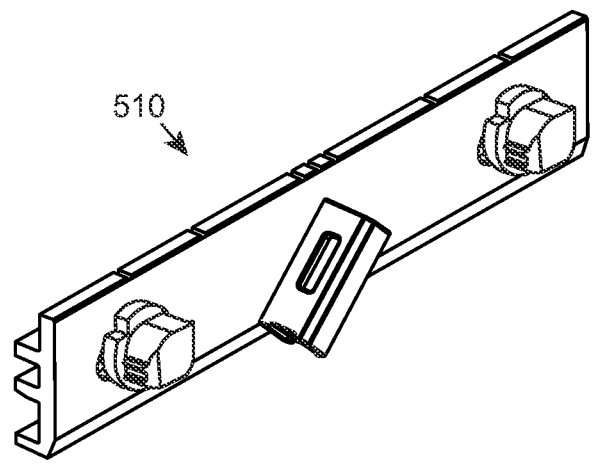

FIG. 5B shows assembly 510 with interlock support coupling 400 inserted into slot 304 of interlock bracket 500. Interlock support coupling 400 may be inserted into slot 304 until a face of interlock housing makes contact with second face 308 of interlock bracket 300. In order to lock interlock support coupling 400 in connection with interlock bracket 300, interlock support coupling 400 may be rotated in a counterclockwise direction about interlock support coupling shaft 410. As described above, such rotation may cause protrusions 416 of interlock support coupling shaft 410 to penetrate surfaces of slot 304, providing for improved electrical grounding.

Figure 5C:
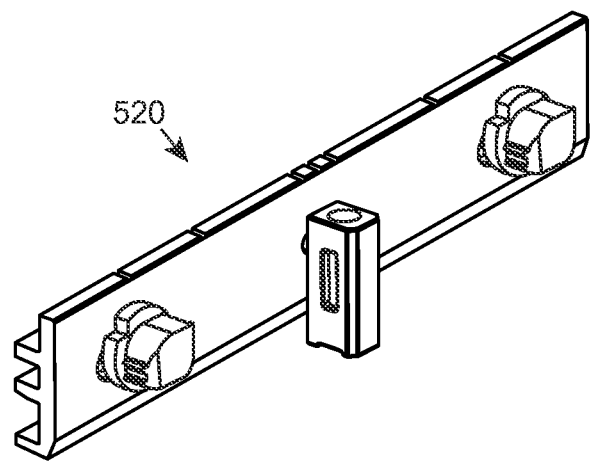

FIG. 5C shows assembly 520 with interlock support coupling 400 locked to interlock bracket 300. As can be seen in FIGS. 5A-5C, interlock support coupling 400 may be configured so that rotation of about 45 degrees counterclockwise results in a locked connection with interlock bracket 300, and that once in a locked position interlock support coupling 400 is in an upright position so as to properly interface with leveling feet as will be described in detail further. In some embodiments, support coupling 400 may be configured so that rotation of 90 degrees or less counterclockwise results in a locked connection with interlock bracket 300, so as to avoid any interference with other components during installation.

Figure 6A:
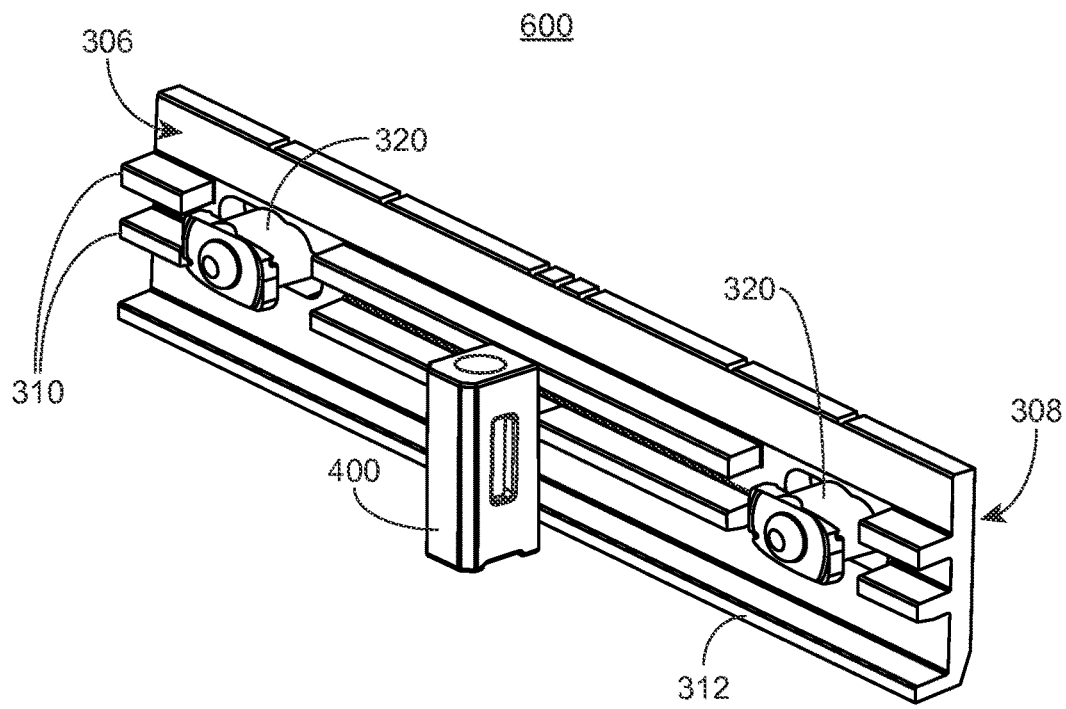
FIGS. 6A and 6B show perspective views of an interlock assembly, according to some embodiments of the invention.
Figure 6B:
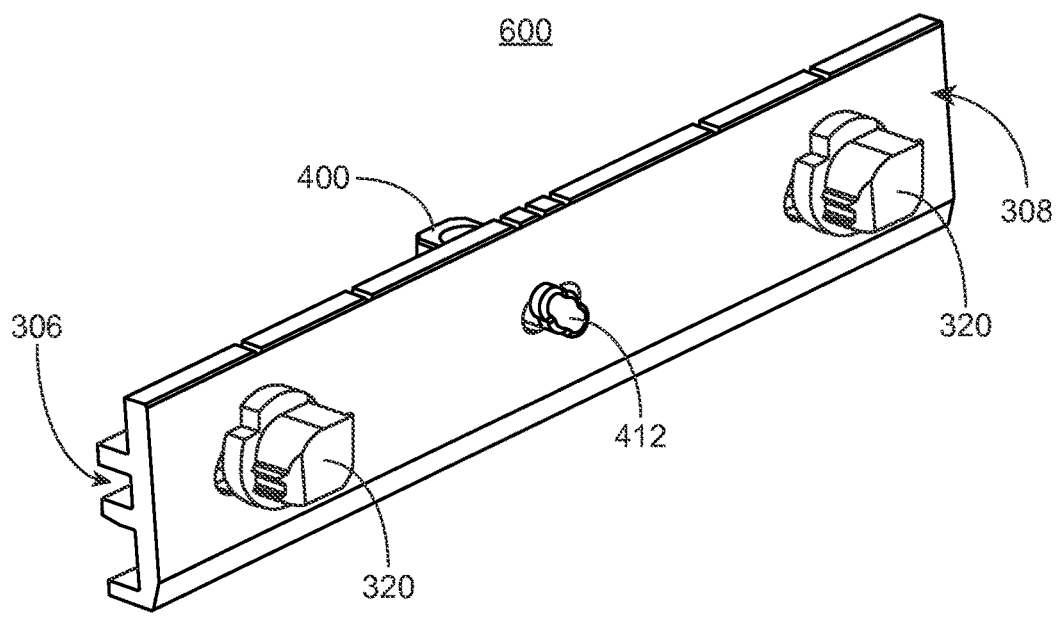

Although FIGS. 5A-5C show interlock support coupling 400 inserted into slot 304 from second surface 308 of interlock bracket 300 without ribs, it will be understood that in some embodiments, interlock support coupling 400 may be inserted into slot 304 from first surface 306 of interlock bracket 300 with ribs 310. FIGS. 6A, 6B, 7A, and 7B show perspective views of alternate configurations of interlock assemblies. Specifically, FIGS. 6A and 6B show interlock assembly 600 resulting from when interlock support coupling 400 is inserted through slot 304 from first surface 306. As can be seen in the lower view of assembly 600 in FIG. 6B, when rotated to its locked position, locking portion 412 does not allow interlock support coupling 400 to pass back through slot 304 due to the geometries of locking portion 412 and slot 304. It can also be seen from FIGS. 6A and 6B that, as described above, when interlock support coupling 400 is in its locked position, housing 402 of interlock support coupling 400 interfaces with ribs 310 and locking portion 412 interfaces with second surface 308. Moreover, it can be seen that when interlock support coupling 400 is in its locked position, housing 402 is upright, while locking portion 412 is rotated relative to slot 304.

Figure 7A:
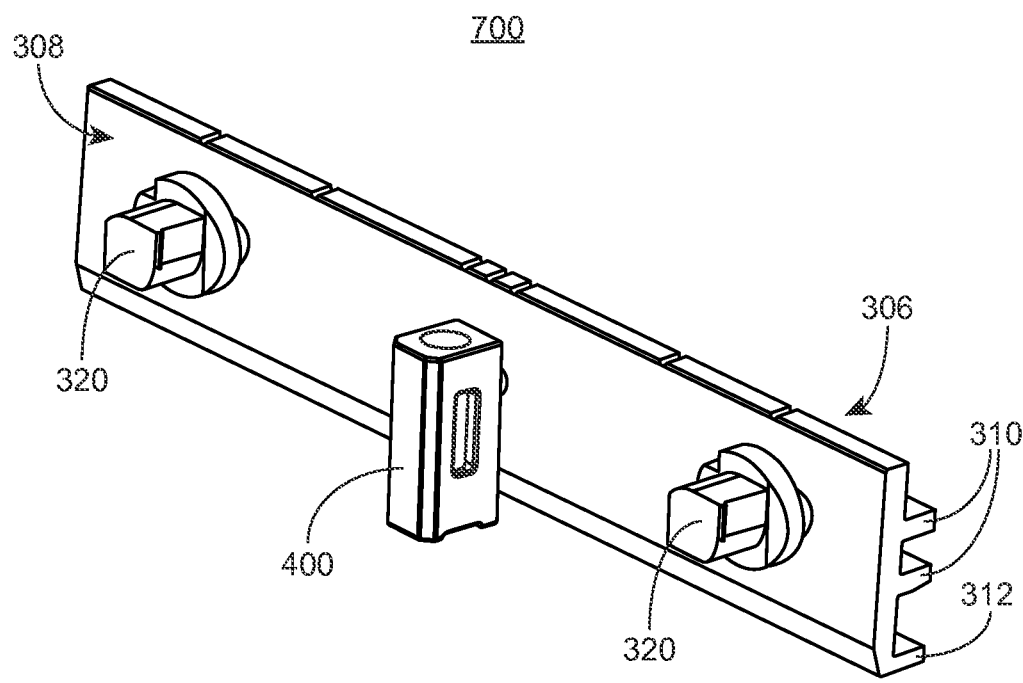
FIGS. 7A and 7B show perspective views of an interlock assembly, according to some embodiments of the invention.
Figure 7B:
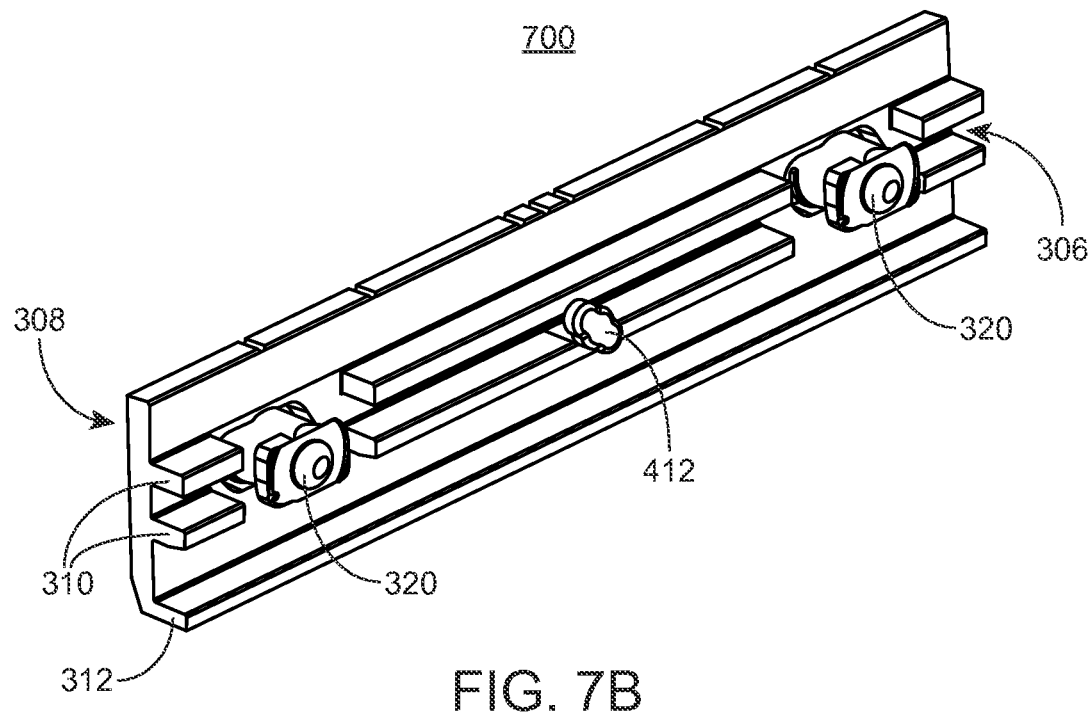

FIGS. 7A and 7B show interlock assembly 700 resulting from when interlock support coupling 400 is inserted through slot 304 from second surface 308. It can be seen from FIGS. 7A and 7B that, as described above, when interlock support coupling 400 is in its locked position, housing 402 of interlock support coupling 400 interfaces with second surface 308 and locking portion 412 interfaces with ribs 310. Moreover, just as in FIGS. 6A and 6B, it can be seen in FIGS. 7A and 7B that when interlock support coupling 400 is in its locked position, housing 402 is upright, while locking portion 412 is rotated relative to slot 304. The ability of interlock support coupling 400 to interface with either side of interlock bracket 300, as shown above with respect to FIGS. 6A-7B, provides added flexibility in orientation of PV arrays and PV modules and other components therein, as will be described in further detail below. It will be understood that references to interlock assembly 520 in this disclosure will be equally applicable to the alternate configurations depicted in FIGS. 6A, 6B, 7A, and 7B, unless otherwise indicated.

Figure 8A:
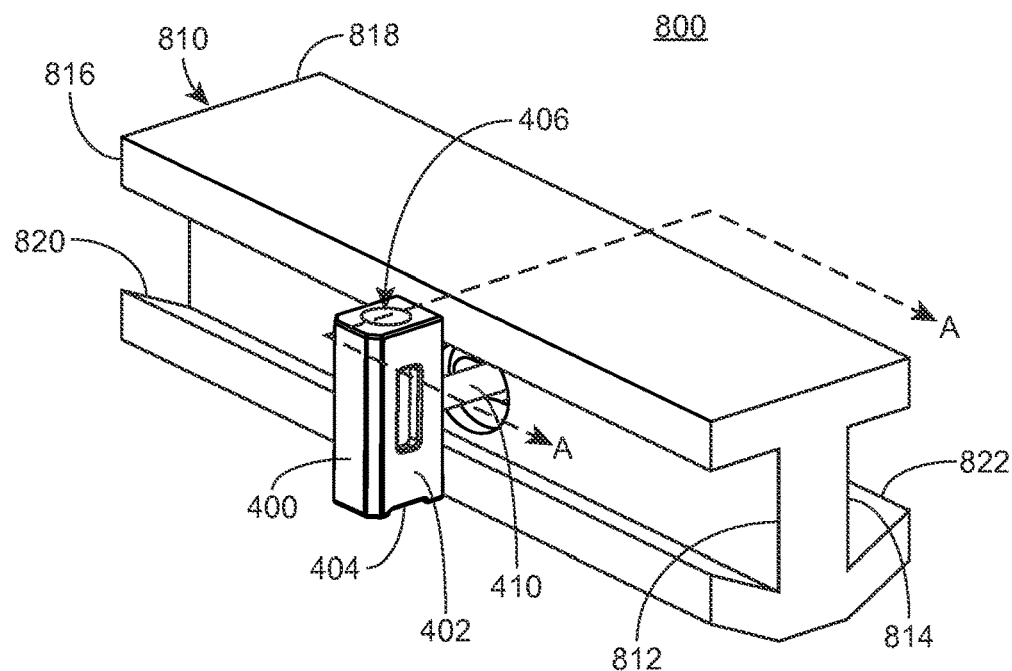
FIGS. 8A-8C show an interlock assembly including an alternate interlock bracket, according to some embodiments of the invention
Figure 8B:
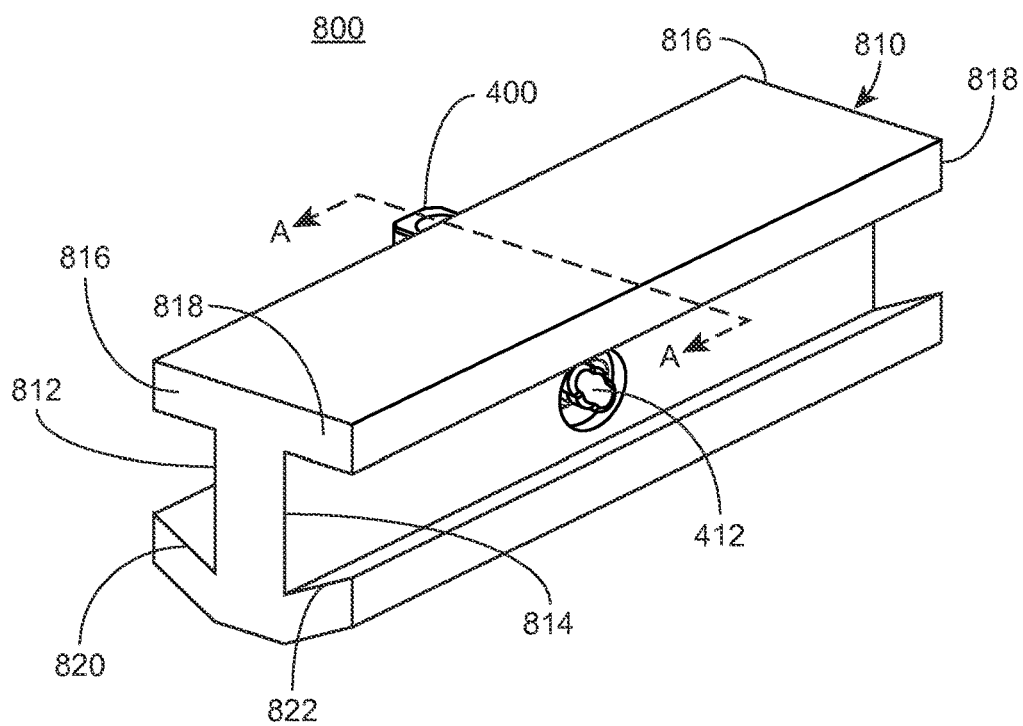
Figure 8C:
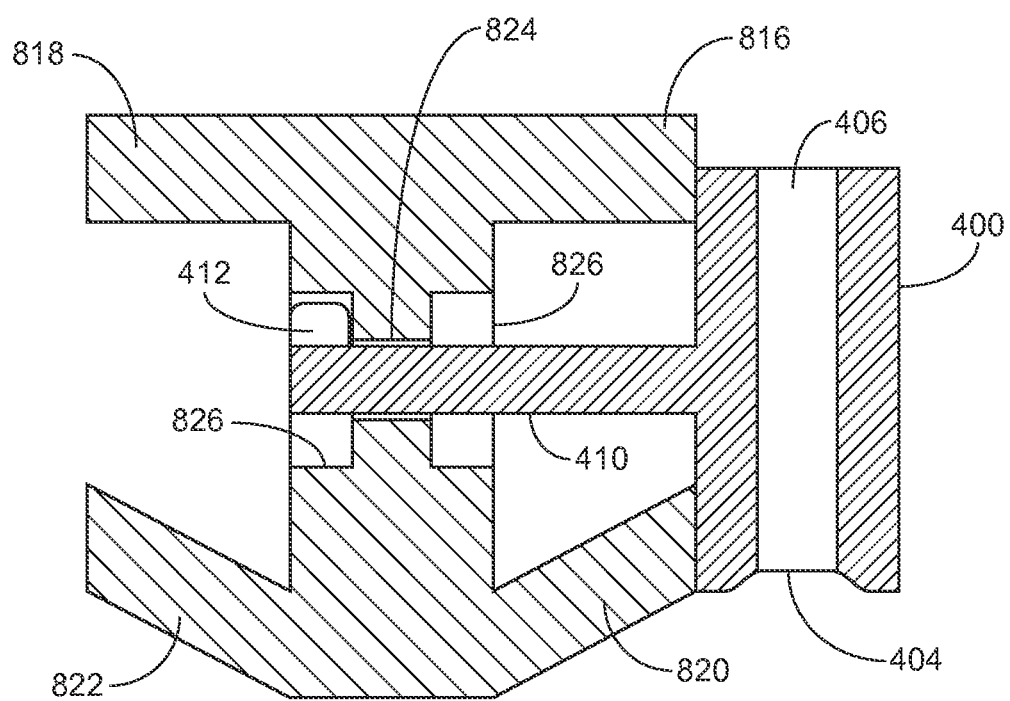

FIGS. 8A-8C show interlock assembly 800 including interlock support coupling 400 and alternate interlock bracket 810. As opposed to interlock bracket 300, which may include openings 302 for couplings 320 that may interface with grooves in PV module frames as described above, interlock bracket 810 shown in FIGS. 8A-8C may include features 816, 818, 820, and 822 that wrap around PV module frames. For example, two sets of PV module frames may sit in the boundary created by surface 812 and features 816 and 820 (with each module frame separated by interlock support coupling 400), and another two sets of PV module frames may sit in the boundary created by surface 814 and features 818 and 822.

In the embodiment shown in FIGS. 8A-8C, interlock support coupling 400 may be inserted into interlock bracket 810 on the side of surface 812, although as with interlock 300 described above, interlock bracket 810 may allow interlock support coupling 400 to be inserted from the side of surface 814 as well. As can be seen in FIG. 8C, which is a cross-sectional view of segment A-A depicted in FIGS. 8A and 8B, interlock bracket 810 may include recesses 826 at each of surfaces 812 and 814 and slot 824 having a smaller diameter. Slot 824 may be sized to appropriately fit (e.g. by an interference fit) interlock support coupling shaft 410, and recesses 826 may be sized to appropriately fit (e.g. by an interference fit) locking portion 412. As can be seen in FIG. 8C, the components may be sized so that housing 402 rests against surfaces of features 816 and 820, and locking portion 412 does not protrude from surface 814.

It will be understood that interlock assembly 800 may otherwise function the same as interlock assembly 520. For example, recesses 826 may be configured to have centering features such as centering features 316 of slot 304 (described above with respect to interlock bracket 300) to interface with feature 414 of interlock support coupling 400. Additionally, interlock bracket 800 may be configured (similar to interlock bracket 300 described above) so that rotation of support coupling 400 of about 45 degrees counterclockwise results in a locked connection with interlock bracket 800, and that once in a locked position interlock support coupling 400 is in an upright position so as to properly interface with leveling feet.

Figure 10:
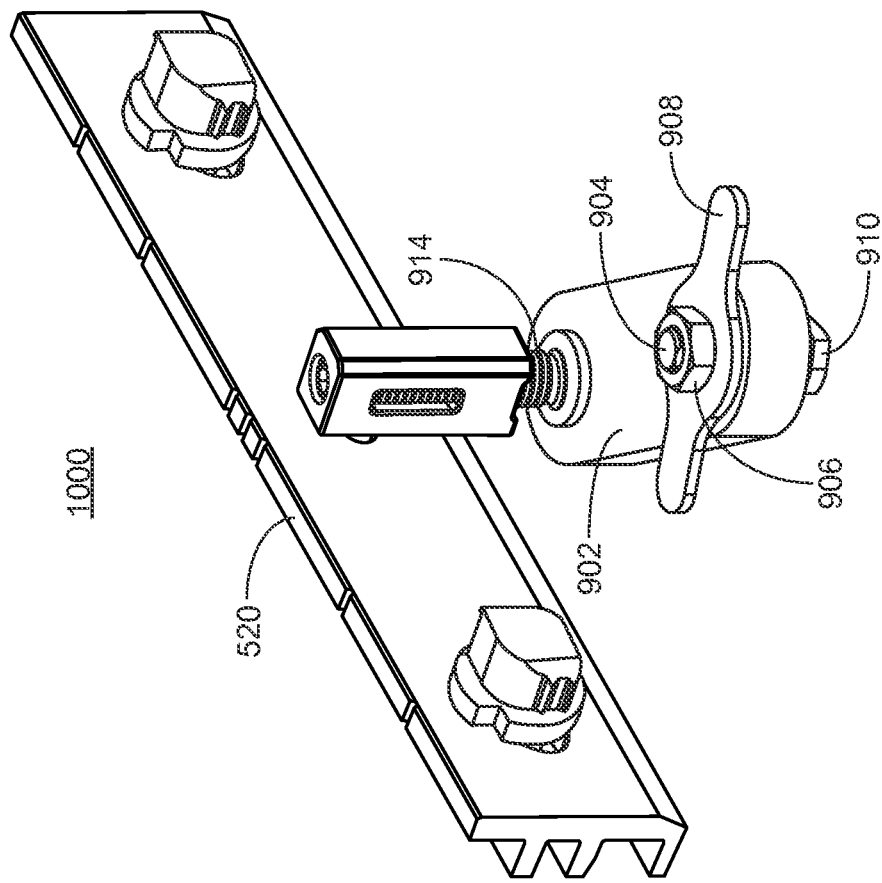
FIG. 10 shows perspective views of an interlock assembly coupled to a base of a leveling foot, according to some embodiments of the invention.
Figure 9:
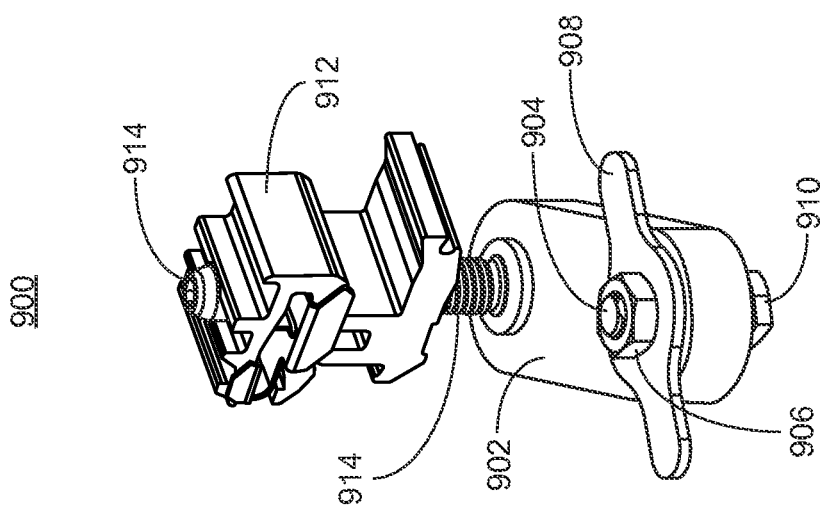
FIG. 9 shows perspective views of a leveling foot assembly, according to some embodiments of the invention.

Once interlock assembly 520 (or 800) is assembled in accordance with FIGS. 5A-5C, it may interface with leveling feet, as will be described with reference to FIGS. 9 and 10. As described above, many possible leveling feet and associated couplings may be employed in mounting of PV modules. FIG. 9 shows a perspective view of leveling foot assembly 900. Assembly 900 may include base portion 802 which is configured to be affixed to supporting structure (not shown) such as a roof rafter or rail structure. Although base portion 902 may be configured to be affixed to supporting structure by any suitable couplings, FIG. 9 shows base portion 902 fixed via components 904, 906, 908, and 910. Base portion 902 may be further coupled to PV module coupling device 912 via screw 914.

PV module coupling device 912 is a "rock-it" style connector manufactured by Zep Solar, which is arranged to connect to the frames of two adjacent PV modules. Such a coupling device is described and illustrated, for example, in commonly assigned U.S. patent application Ser. No. 14/615, 320, Publication No. 2015/0155823-A1, the disclosure of which is herein incorporated by reference in its entirety. However, assembly 900 is not limited to use of such a coupling device. A multitude of different styles of coupling devices are compatible with the system, as will be understood by those of skill in the art. It will be understood that reference herein to PV module coupling device 912 is not intended to be limited to the "rock-it" style connector disclosed above. While leveling foot assembly 900 may be utilized similar to leveling feet 104 described above with respect to FIGS. 1 and 2 to support two adjacent PV modules in the y-direction, they may only be used where there are no conflicts with interlocks 106. In contrast, in situations such as those described above with respect to PV modules 102*b* in FIG. 2, the conflict between adjoining PV modules and underlying rafters (or other support structures such as rail systems) requires the use of something other than leveling foot assembly 900.

In accordance with embodiments of the invention, it may be desirable to utilize base portion 902 of leveling foot assembly 900 with interlock assembly 520, which would both allow for resolution of conflict between interlocks and leveling feet, and reduce the part count and costs of parts in assembly and installation of a PV array. FIG. 10 shows perspective views of assembly 1000 including interlock assembly 520 coupled to base portion 902 via screw 914. As shown in FIG. 10, once PV module coupling device 912 is removed from assembly 900 (e.g., by unscrewing it from screw 914), screw 914 may be free to engage opening 404 of interlock support coupling 400. It will be understood that once PV modules are coupled to interlock bracket 300, rotating screw 914 within interlock support coupling 400 may adjust the level at which PV modules sit.

FIG. 11 shows assembly 1000 including interlock assembly 520 and base portion 902 as installed with two adjacent PV modules 102*b*. In a typical installation, the overlap of the junction of modules 102*b* and rafter 105 would not allow a typical leveling foot assembly 900 to be used in conjunction with a typical interlock (such as interlock 106 described above), or would require that the base portion 902 be designed to be long enough to extend from some point outside of interlock assembly 520 to rafter 105.

In contrast, as shown in FIG. 11, interlock assembly 520 with interlock support coupling 400 and interlock bracket 300 can couple with rafter 105 via a simple base portion 902 that requires much less material, and accordingly costs significantly less. Moreover, elimination of lengthy base portions decreases the moment on such members and allows them to withstand greater loads. As can be seen in FIG. 11, and as described above with respect to FIG. 4, interlock support coupling 400 is designed to fit in between a small gap between adjacent PV modules 102*b*. This allows increased flexibility and wider applicability to the use of assembly 1000 as will be described in further detail below.

The flexibility of interlock assembly 1000 allows for a wide variety of patterns in which it can be used to both affix adjacent PV modules and other components and provide necessary support for mounting the PV modules onto the support structures. FIGS. 12A-12I show exemplary patterns of PV modules and other components coupled with interlock assemblies, according to some embodiments of the invention. In each of the exemplary patterns, arrow 1102 depicts the "down roof" direction, and the circular symbol of interlock assembly represents interlock support coupling 400.

FIG. 12A, for example, shows interlock assembly 1000 coupling two PV modules 102 and PV array skirt 1110. PV array skirt 1110 may be a primarily aesthetic component that sits at an end of a PV array so as to provide a clean visual appearance, and may be configured to have components similar to PV modules 102 to make it compatible with couplings (for example couplings 320) of interlock assembly 1000. As can be seen in FIG. 12A, interlock support coupling 400 may be designed to fit in a pre-existing gap between adjacent modules 102 "up-roof" relative to assembly 1000.

FIG. 12B is similar to FIG. 12A, except that it shows interlock assembly coupled to three PV modules 102 in addition to PV array skirt 1110. FIGS. 12C, 12D, and 12E all show interlock assembly 1000 coupling only PV modules 102, with 12C showing two coupled PV modules 102, 12D showing four coupled PV modules 102, and 12E showing three coupled PV modules 102. Each of FIGS. 12A-E shows interlock assembly 1000 with interlock support coupling 400 "up-roof" of the rest of interlock assembly 1000. However, as described above, the flexibility of interlock assembly 1000 allows for interlock support coupling 400 to be oriented in the opposite direction as well. Accordingly, FIGS. 12F-12I show patterns similar to the aforementioned patterns of 12B-12E except that interlock support coupling is disposed "down-roof" of the rest of interlock assembly 1000.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An assembly for mounting photovoltaic (PV) modules, the assembly comprising:
   a bracket comprising two openings, and a slot positioned between the two openings, wherein the two openings are configured to receive interlock couplings to attach at least two adjacent PV modules together to the bracket; and
   a support coupling member attached to the bracket, the support coupling member comprising a housing and a coupling shaft extending from a surface of the housing,
   wherein the coupling shaft is positioned in the slot directly attaching the support coupling member to the bracket,
   wherein the housing is configured to be directly attached to a supporting foot, and
   wherein the support coupling member is configured to attach to the bracket by first inserting the shaft of the support coupling member through the slot at a first angle relative to the bracket and then lock the support coupling member to the bracket by rotating the entire support coupling member to a second angle relative to the bracket.

2. The assembly of claim 1, wherein the slot comprises a rounded slot and a circular centering feature in the middle of the rounded slot configured to aid in centering the shaft of the support coupling member within the slot.

3. The assembly of claim 1, wherein a difference between the first angle and the second angle is approximately 45 degrees.

4. The assembly of claim 1, wherein the bracket further comprises:
   a first surface; and
   a second surface opposite the first surface, wherein the slot extends from the first surface to the second surface; and
   wherein the shaft of the support coupling member is configured to be inserted into the slot from either the first surface or the second surface.

5. The assembly of claim 1, wherein the shaft comprises at least one protrusion on a surface of the shaft that penetrates into a surface of the slot of the bracket to provide an electrically grounded connection.

6. The assembly of claim 1, wherein the bracket is configured to affix at least three PV modules together.

7. The assembly of claim 1, wherein the bracket is configured to affix the at least two adjacent PV modules to at least one array skirt.

8. The assembly of claim 1, wherein the support coupling member is configured to be upright when rotated to the second angle.

9. A photovoltaic (PV) module mounting system, the system comprising:
   a bracket comprising two openings, and a slot positioned between the two openings, wherein the two openings are configured to receive interlock couplings to attach at least two PV modules together to the bracket;

a leveling foot configured to affix the system to a support structure; and a support coupling member comprising a housing and a coupling shaft extending from a surface of the housing, wherein the coupling shaft of the support coupling member is positioned in the slot directly attaching the support coupling member to the bracket, wherein the support coupling member is directly attached to the leveling foot, and wherein the support coupling member is configured to attach to the bracket by first inserting the shaft of the support coupling member through the slot at a first angle relative to the bracket and then lock the support coupling member to the bracket by rotating the entire support coupling member to a second angle relative to the bracket.

10. The system of claim 9, wherein the support coupling member comprises a threaded opening, and wherein the support coupling member is coupled to the leveling foot with a screw inserted into the threaded opening.

11. The system of claim 9, wherein the support coupling member is configured to be upright when rotated to the second angle.

12. The system of claim 9, wherein the support coupling member comprises at least one protrusion on a surface of the shaft penetrating into a surface of the slot of the bracket to provide an electrically grounded connection.

* * * * *